United States Patent [19]

Roseman

[11] Patent Number: 5,038,318
[45] Date of Patent: Aug. 6, 1991

[54] DEVICE FOR COMMUNICATING REAL TIME DATA BETWEEN A PROGRAMMABLE LOGIC CONTROLLER AND A PROGRAM OPERATING IN A CENTRAL CONTROLLER

[75] Inventor: Brooks T. Roseman, Asheville, N.C.

[73] Assignee: Square D Company, Palatine, Ill.

[21] Appl. No.: 134,353

[22] Filed: Dec. 17, 1987

[51] Int. Cl.⁵ ............................................ G06F 13/10
[52] U.S. Cl. ................................ 364/900; 364/926.9; 364/949; 364/927.99; 364/921
[58] Field of Search ... 364/200 MS File, 900 MS File, 364/308

[56] References Cited

U.S. PATENT DOCUMENTS

| | | | |
|---|---|---|---|
| 4,038,533 | 7/1977 | Dummermuth et al. | 364/136 |
| 4,149,235 | 4/1979 | Froyd et al. | 364/474.11 |
| 4,180,860 | 12/1979 | Driscoll et al. | 364/900 |
| 4,215,398 | 7/1980 | Burkett et al. | 364/136 |
| 4,228,495 | 10/1980 | Bernhard et al. | 364/136 |
| 4,363,090 | 12/1982 | Garcia | 364/139 |
| 4,517,637 | 5/1985 | Cassell | 364/138 |
| 4,648,062 | 3/1987 | Johnson et al. | 364/900 |
| 4,751,635 | 6/1988 | Kret | 364/200 |
| 4,791,556 | 12/1988 | Vilkaitis | 364/200 |

OTHER PUBLICATIONS

Lotus Development Corporation, "Lotus Measure; Data Direct to Lotus Spreadsheets"; 1986, 1987, Cambridge, Mass.
Lotus Development Corporation, "Lotus Developer Tools, Comprehensive Developer Tools for 1-2-3 and Symphony".
Strawberry Tree Computers, Inc., "Laboratory and Industrial Data Acquisition and Control", Sunnyvale, Calif.—'Labtech Real Time Access for the IBM PC', pg. 40;—'Labtech Notebook for the IBM PC', pgs. 38 and 39;—'Labtech Acquire for the IBM PC', pages 40 and 41.
Lai, Robert S.; *Writing MS-DOS Device Drivers*, 1987, Waite Group, Inc., pp. 13-17, 28-30 and 36-37.
Square D Company automation products literature.
Microsoft Systems Journal, "Special Windows Issue"; vol. 1, No. 1, Oct. 1986; pp. 11-14.
Microsoft Systems Journal, "Interprogram Communication Using Windows' Dynamic Data Exchange", vol. 2; No. 5, Nov. 1987, pp. 13-26 and 33-38.

*Primary Examiner*—Thomas M. Heckler
*Attorney, Agent, or Firm*—Michael J. Femal; Thomas K. Stine

[57] ABSTRACT

Add-in program instructs operable through a general purpose spreadsheet program in a personal computer to move real-time status and control messages directly between cells in the displayed spreadsheet and addressed registers of programmable logic controllers (PLCs) is disclosed. The PLCs operate such as machine tools for processing stations and connect together and to an interface card in the personal computer over a network. The invention facilities a user's real-time monitoring and control of the manufacturing performed at the machine tools or processing stations through mathematical and logical features of the spreadsheet, which are well known and easy for a user to implement.

14 Claims, 13 Drawing Sheets

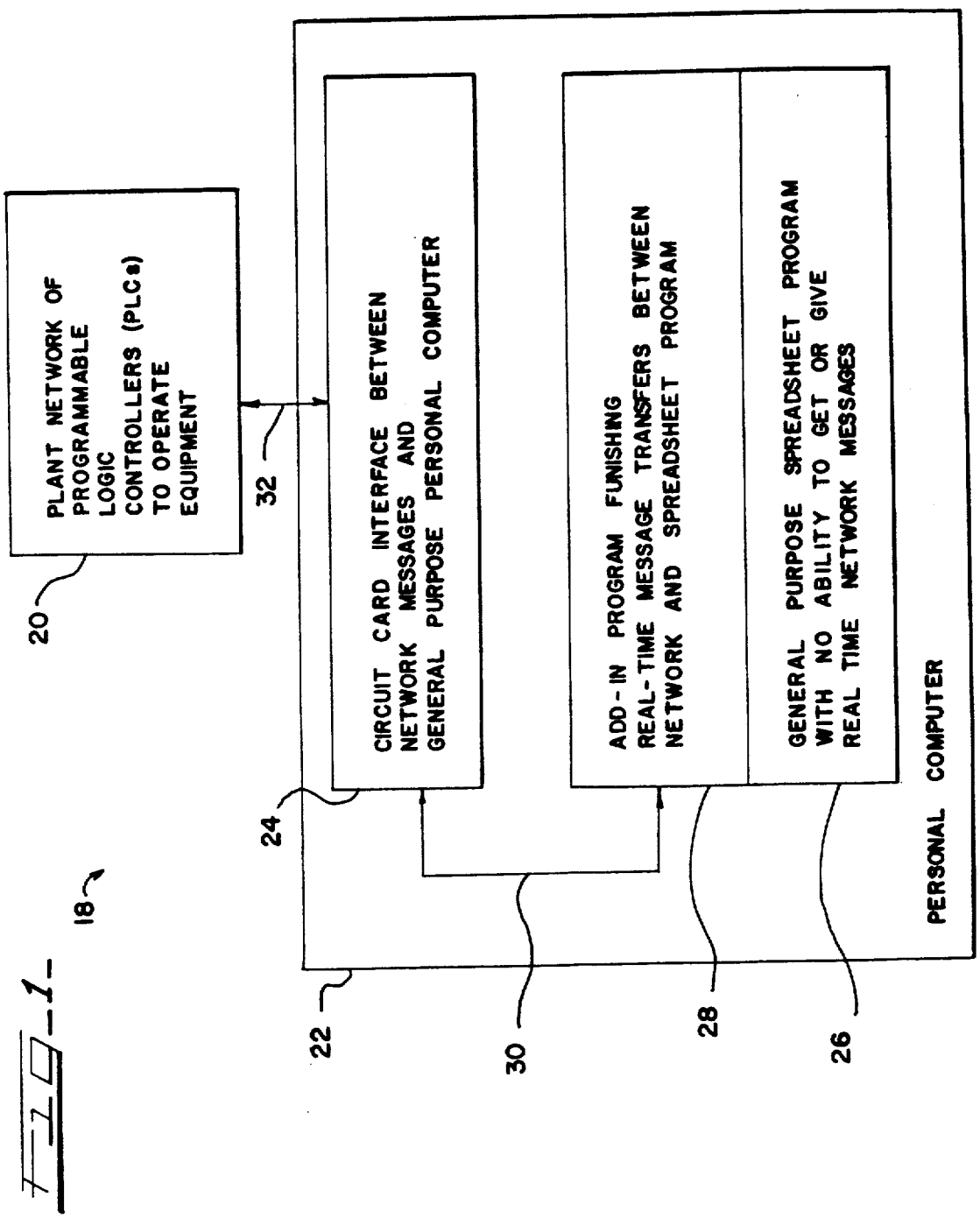

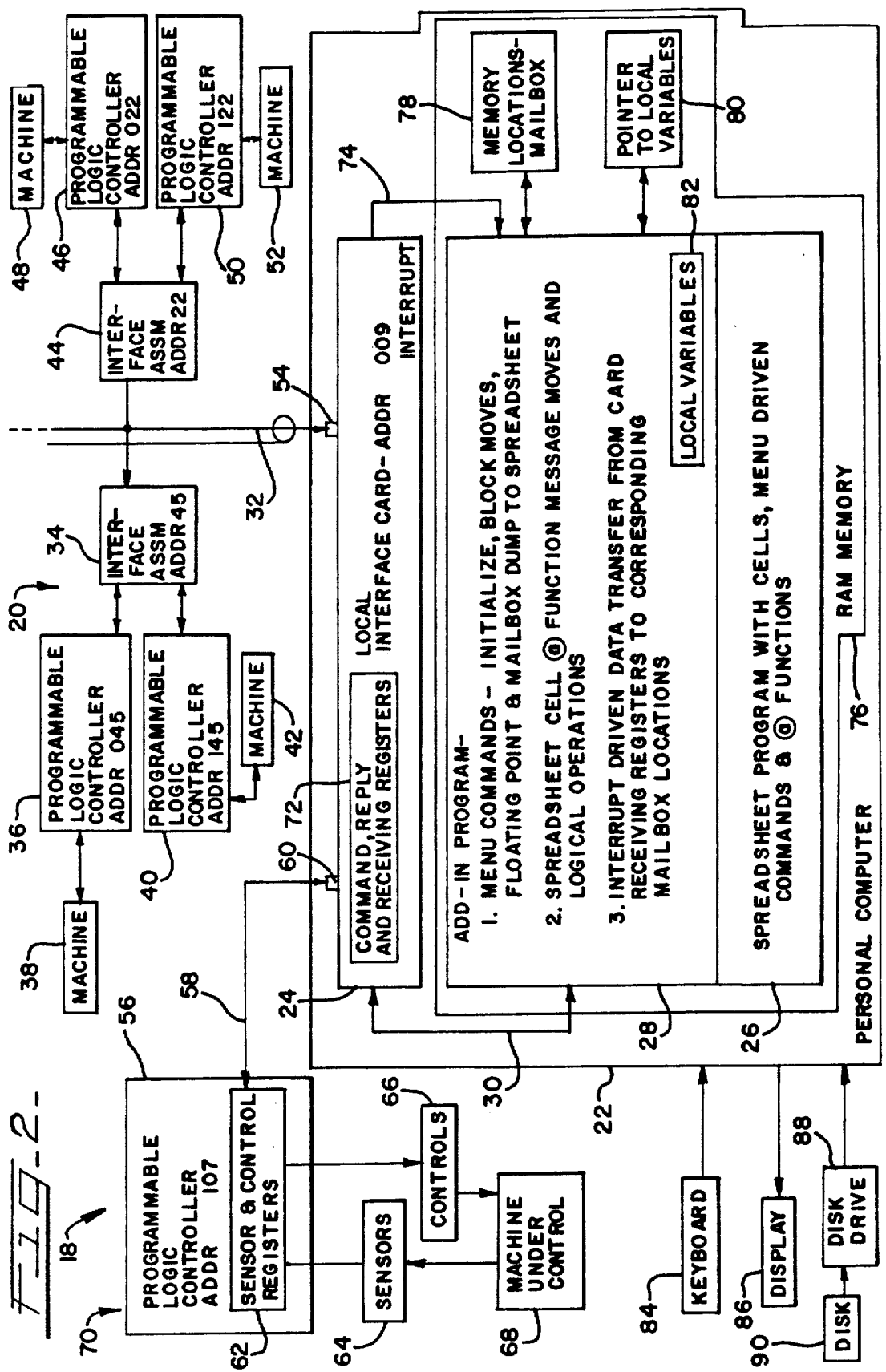

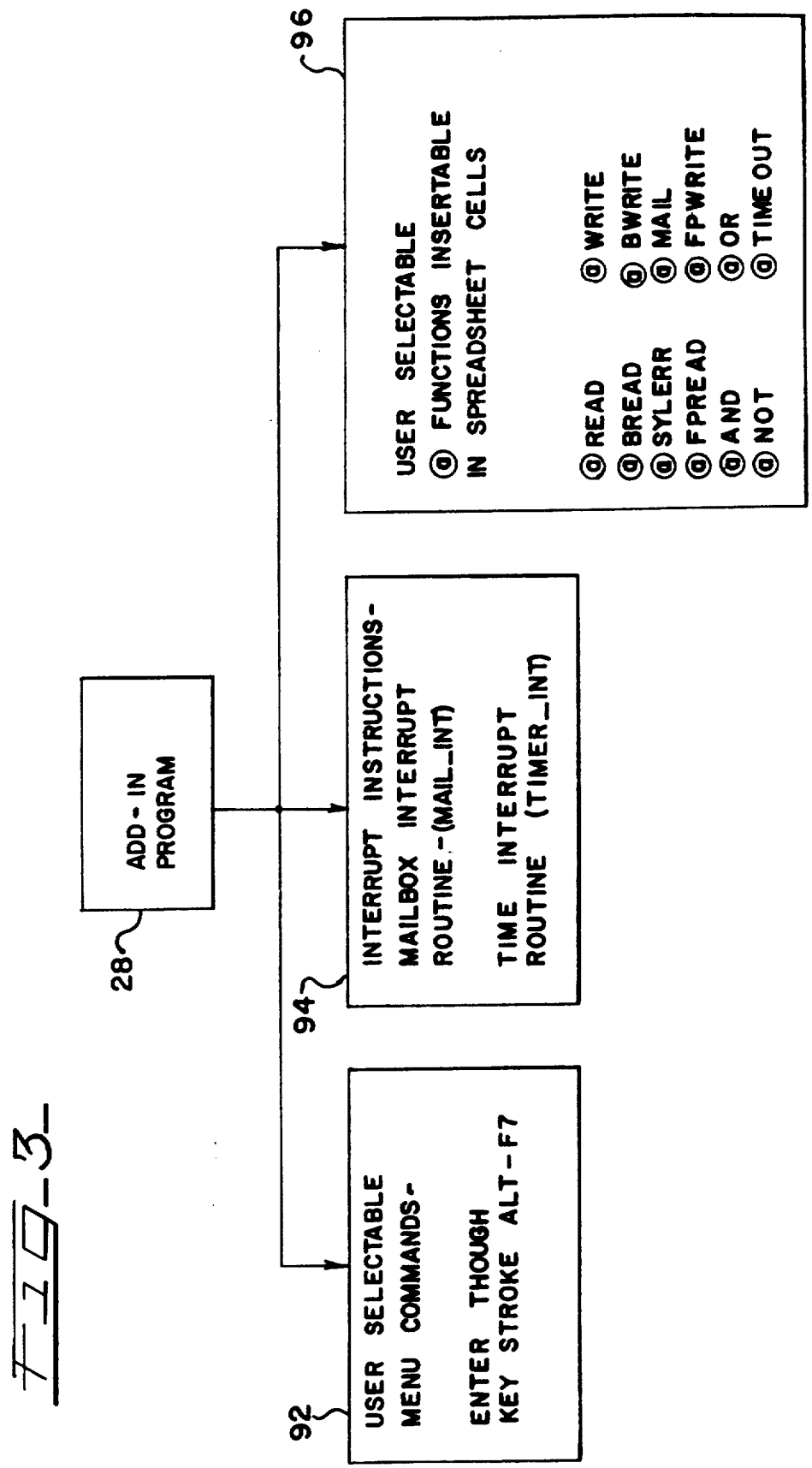

FIG.4

ALT - F7  MENU

1. INITIALIZE LOCAL INTERFACE CARD - (INIT)
2. READ BLOCK OF 128 REGISTERS - (BLOCK-READ)
3. WRITE BLOCK OF 128 REGISTERS - (BLOCK-WRITE)
4. FLOATING POINT -
   SUB - MENU
   1. READ BLOCK OF 32 FLOATING POINT NUMBERS - (FP_READ)
   2. WRITE BLOCK OF 32 FLOATING POINT NUMBERS - (FP_WRITE)
5. MAILBOX -
   SUB-MENU
   1. SET MAILBOX LOCATION IN RAM MEMORY RECEIVING DATA FROM GROUP OF REGISTERS IN INTERFACE CARD AND SET CELL LOCATIONS IN SPREADSHEET PROGRAM RECEIVING MAILBOX DATA - (MAIL_SET)
   2. DUMP CONTENTS OF MAILBOX LOCATIONS FROM RAM MEMORY TO CELLS IN SPREADSHEET PROGRAM - (MAIL_DUMP)
   3. RESET -
      SUB-SUB-MENU
      1. OUTPUT, CHANGE CELL LOCATIONS RECEIVING DATA DUMP - (MBR_OUTPUT)
      2. MAILBOX, CLEAR A SPECIFIED MAILBOX FROM RAM MEMORY - (MBR_MB)
6. QUIT THIS MENU

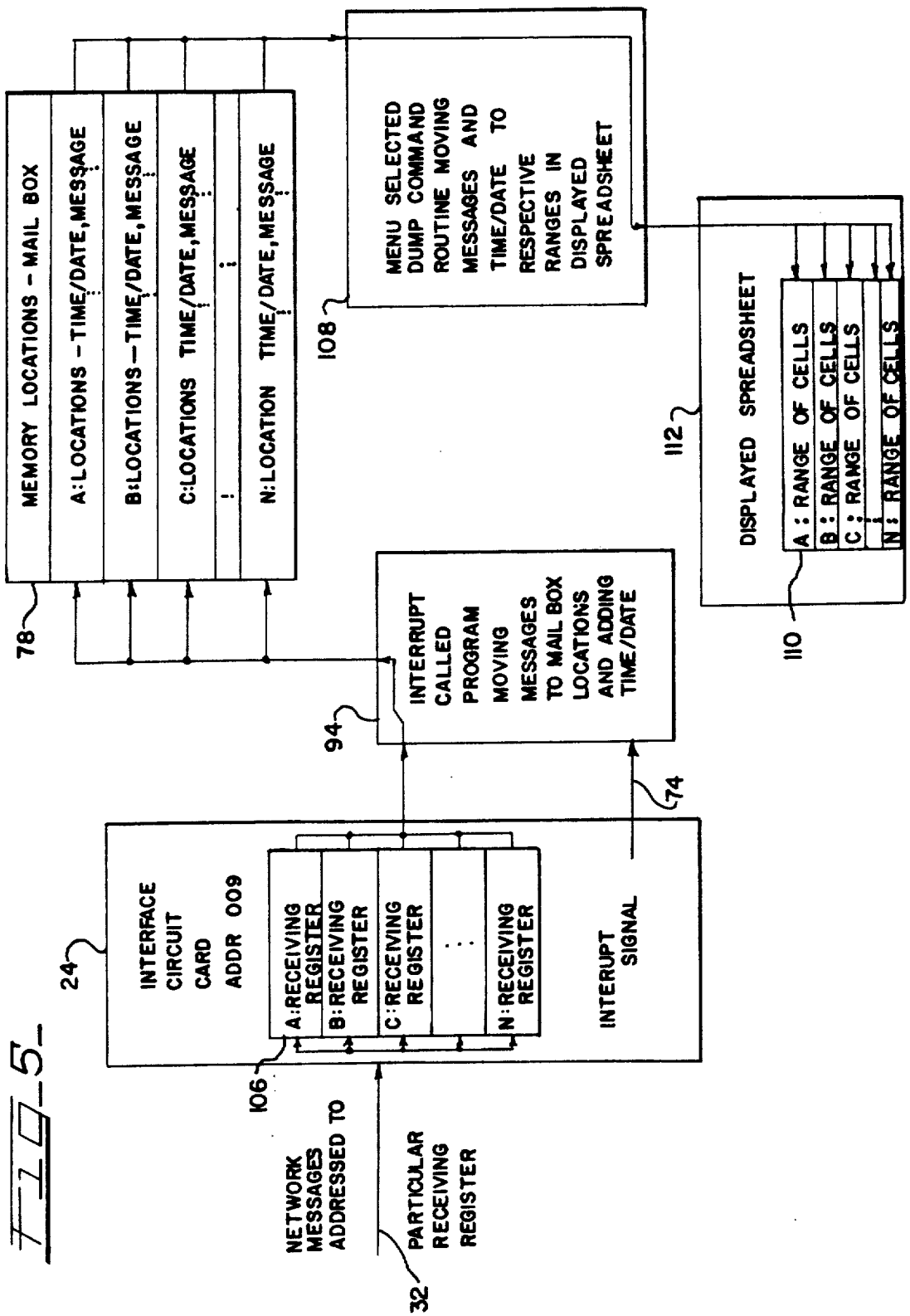

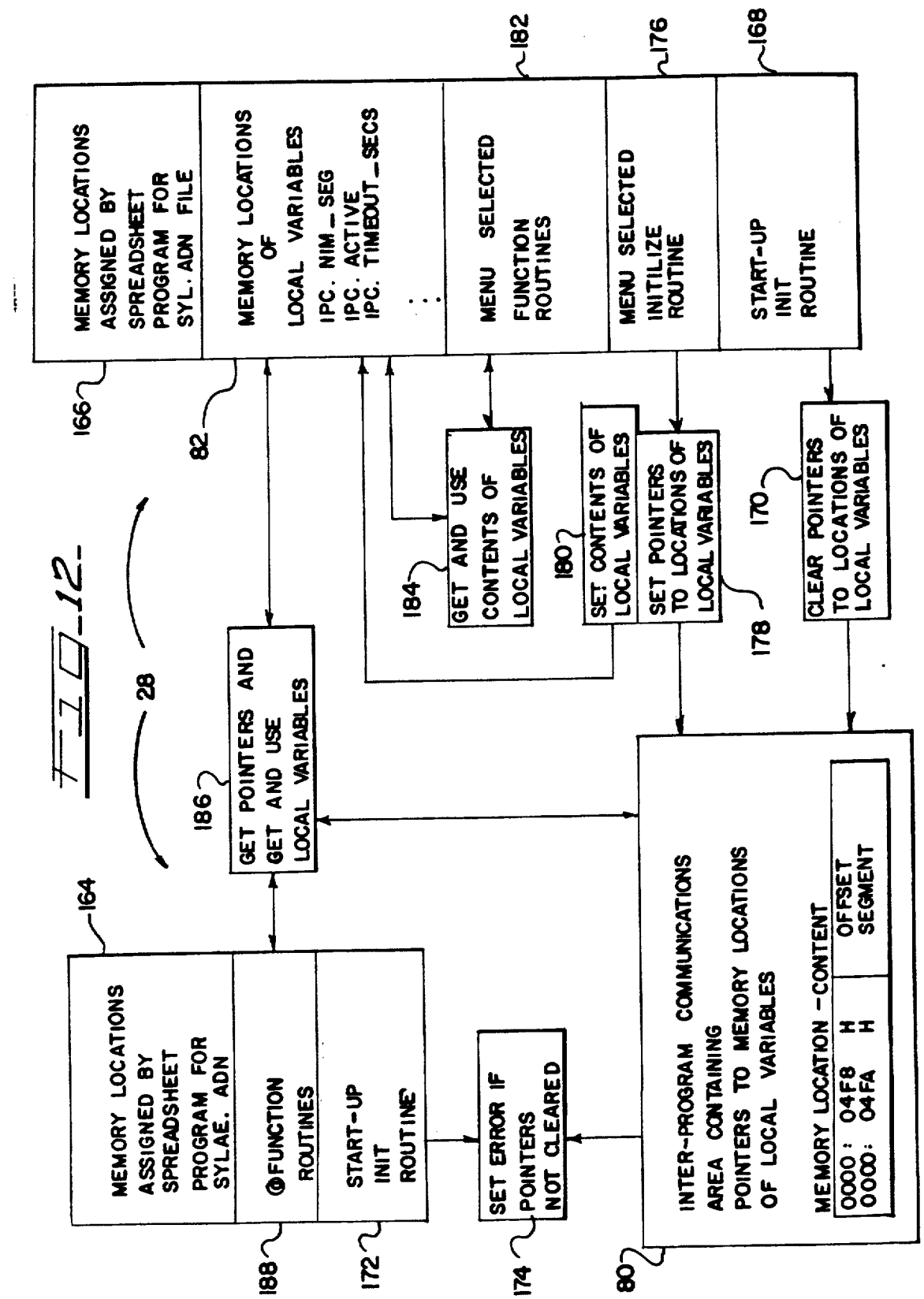

FIG-13-
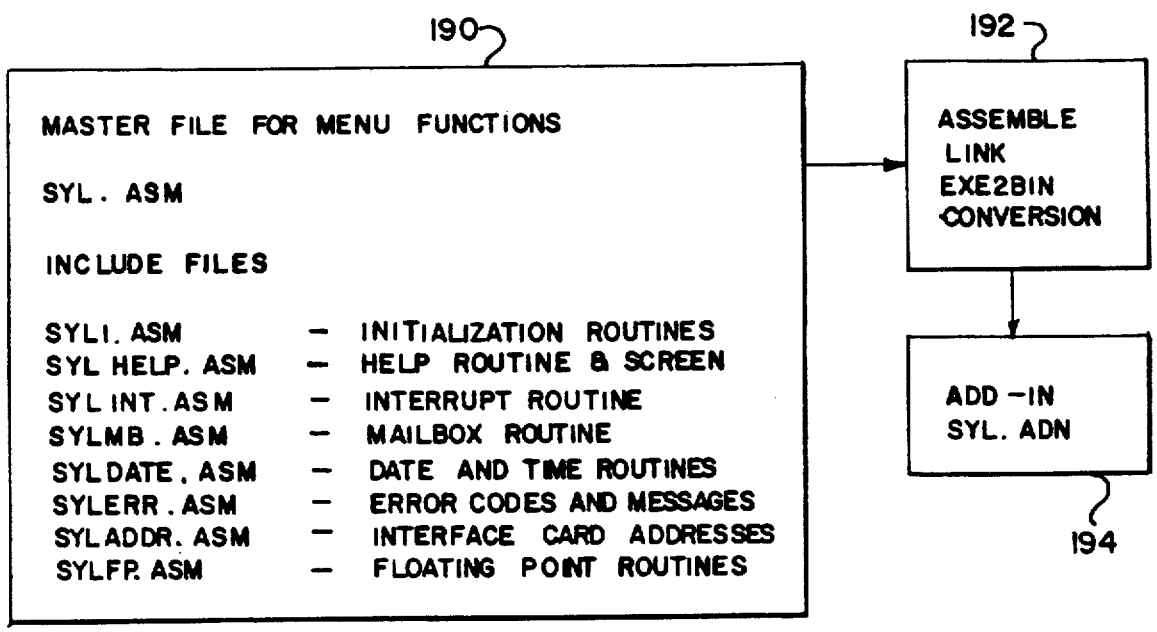
FIG-14-
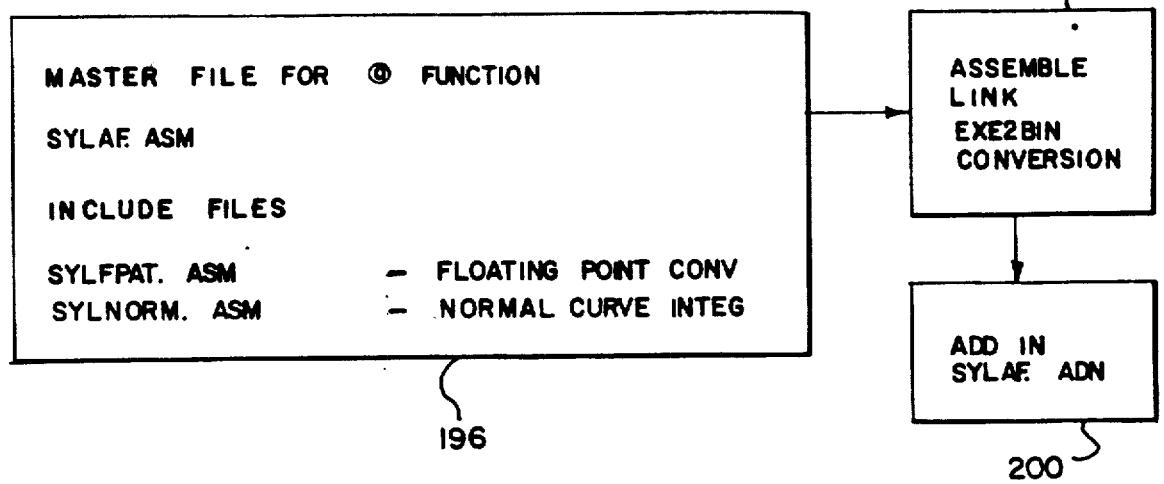

DEVICE FOR COMMUNICATING REAL TIME DATA BETWEEN A PROGRAMMABLE LOGIC CONTROLLER AND A PROGRAM OPERATING IN A CENTRAL CONTROLLER

DESCRIPTION

BACKGROUND OF THE INVENTION

This invention generally relates to programmable logic controllers that direct the automatic operation of such as machine tools, and process equipment to manufacture goods and chemicals, and particularly relates to furnishing true real-time control of such programmable logic controllers (PLCs) through a general purpose spreadsheet program operating in a personal computer.

Machine tools such as screw machines have come to be operated automatically. This eliminates the cost of manual labor in operating the machine and can achieve more uniform products. The automation originally occurred by arranging relays to perform the logical functions of proceeding through a manufacturing process. Switches sensed the movement of tools relative to the work piece and caused the opening and closing of the relays; the relays in turn caused the sequential selection and operation of different tools on the work piece.

Much skill is required however to design the system, to set-up the limit switches at the proper locations, to connect the switches to the proper relay solenoids and to connect the relay contacts to the proper motors, timers and solenoid controlled valves in achieving the automated operation. Changing even one dimension of a part being made or one process variable in a chemical reaction moreover required skilled labor to re-wire the control switches or relays. Such systems worked well in producing large numbers of parts from a single set-up, but the development of manufacturing fewer numbers of more customized parts on one machine made the frequent changes of the relay controlled machines too expensive.

Responsive to this rise in cost, PLCs replaced the relay controls. PLCs furnished a fixed wiring from the switches, motors, and solenoid valves to a general purpose logic device. This eliminated rewiring the controls for each different part or variation of a part to be made. The set-up for each different part or variation of a part then only required changing the logical commands in the logic device. With the advent of the microcomputer as the logic device, changing the logical commands in the logic device became a matter of re-programming the microcomputer. Skilled labor then only had to write one program to make each different part or variation of a part, and an unskilled operator then could load the different programs into the PLC as desired to make a desired part. This substantially eliminated costly set-up for each different part; the manufacture of that part or the running of that process was fixed, however, by the fixed nature of the program.

The fixed nature of the program does not always allow for varying automatic operation of the screw machine, for example as the material of the work piece varies, or for example as the characteristics of a process feedstock vary. Moreover, the fixed program does not allow an operator to vary the manufacturing or processing parameters as changes occur in the manufacturing or processing operation to achieve desired efficiencies and levels of quality.

The PLCs have been linked together in networks over co-axial cable to co-ordinate the operation of an entire manufacturing or processing plant. The network require separate interface modules terminating each drop of the co-axial cable to perform the necessary handshaking for positive message transfer between the addressable registers of the PLCs. These messages usually comprise status information indicating the condition of the sensors and drives of each machine tool or processing station and control information commanding the operation of the drives or valves of the tools or stations. The messages also can contain numerical information indicating the number of parts made or the temperature or pressure of a point in a process.

A centrally located programming device can also be connected to the network to change the program or sequence of logical steps to be implemented by any selected PLC on the network. Such a programming device can be a personal computer, for example an IBM or IBM-compatible personal computer, operating a program that displays relay ladder diagram charts that a skilled user develops to create desired logical steps for a PLC. The personal computer also contains a network interface circuit card, connected to the co-axial cable, that handles the network handshaking and positive message transfer in response to commands by the personal computer written to and from accessible registers on the circuit card. The registers of the interface card are available to programs running in the personal computer able to access them to enable customized programs to send and receive messages across the PLC network.

Programming the PLC's over the network with the relay ladder diagram chart program in a personal computer enables a programmer to change the set operation of a machine or process as desired. The operation at the personal computer, however, is still one step, the programming step, removed from personally controlling operation of the machine tool or process station. Any manufacturing changes desired by the operator must be implemented through re-programming the individual PLC.

Developing customized programs that directly enable an operator at a personal computer to supervise and actually control the automatic operation of the PLCs quickly becomes expensive due to the large amount of highly skilled labor required. Such custom programs obtain stated information from the PLCs as it occurs and send control information in response to changes in the status information. Such information exchange is described as "real time" to emphasize that there exists little or no delay in receiving the information after the information becomes "real" or available. The cost of updating or varying the customized programs to provide flexibility in the automated operation of an entire plant becomes prohibitive. Further, varying custom programs often reaches a point where the cost of making the variation within the restraints of the original program exceeds the cost of writing a new custom program. The exchange of "real time" information stands as the key to true operator control of the manufacturing plant.

Programs have become available that strive to provide this real time exchange of information in controlling, monitoring and analyzing processes and instrumentation. The user provides a circuit card interface between his process or instruments and the personal computer. The user also writes a device driver program for the personal computer that facilitates the operating system program to communicate with the circuit card interface. The user then installs a commercially available information acquisition program to transfer the desired information between the operating system program and popular and commercially available spreadsheet, data base and analysis programs. The user then exercises control of the manufacturing processes from the spreadsheet, data base or data analysis program through the information acquisition program. This, however, has some undesirable aspects.

From the user's perspective, every transfer of information to and from the spreadsheet, data base or analysis program must occur through menu selected keystroke commands. Sending information to a PLC occurs by transfers to the acquisition program, the operating system program, the device driver program, the interface card, and the network to the addressed PLC registers. Reading from addressed PLC registers requires sending a transmit command to the addressed PLC in the described sending sequence and then sending a read command to the acquisition program to get the transmitted information from reply registers in the interface card through the device driver program, the operating system program and the acquisition program. While the speed of personal computers reduces all of these transfers to short, almost unnoticeable periods, there are still some things that cannot be done. For example, the calculation of the arguments contained in the cells of a spreadsheet program cannot directly move information between addressable registers of a PLC and the cells of a displayed spreadsheet. Also, writing a device driver for the interface card remains a time consuming and highly skilled task.

SUMMARY OF THE INVENTION

The invention furnishes a program or instruction means that operates through a general purpose spreadsheet program to effect information transfers to and from the addressable registers of a PLC and assigned cells of a displayed spreadsheet directly from the spreadsheet program and without transfers through the operating system program or a specially written device driver program. This facilitates a manufacturer configuring a PLC network with a central control of the manufacturing operation from a spreadsheet program operating in a personal computer. Operator control of the PLCs connected to the network occurs through the flexible and easily understood features commercially available in general purpose spreadsheet programs and facilitates true "real time" control and monitoring of the manufacturing plant directly from the displayed spreadsheet of the spreadsheet program.

The invention provides single @ function WRITE commands in cells in the displayed spreadsheet to transfer information contained in that cell or information contained in relatively addressed cells to be written into desired and addressed PLC registers. A single @ function READ command in cells of the displayed spreadsheet causes the addressed PLC to transmit the information contained in certain addressed registers directly into that cell or relatively addressed cells in the displayed spreadsheet. These @READ and @WRITE functions become executed simply upon recalculating the displayed spreadsheet to effect the information transfers.

The invention also provides menu selected commands for reading or writing blocks of information between addressed PLC registers and ranges of cells in the displayed spreadsheet. These menu selected commands operate through the spreadsheet program free of any acquisition program or device driver program.

The invention also provides for automatic storage of information transmitted to the central controller from the PLCs at regular intervals or as conditions change in the PLCs. These transmissions from the PLCs to the central controller usually are initiated by the PLCs. The invention furnishes an interrupt program that moves the messages received in the interface circuit card to respective memory locations forming a mailbox for each PLC. This prevents sequential messages from one PLC from overwriting the previous message and losing the information content. Thus the sequential messages initiated from one PLC are stored by the present invention in one mailbox area of sequential memory locations. Under an operator selected menu command, the invention moves all of the sequential messages from each PLC into assigned ranges of cells in the displayed spreadsheet.

In particular, the invention involves a system for operating equipment in which a PLC proximate a machine tool or processing station controls the specific operation of that machine tool or processing station. The PLC also is connected to a network of PLCs and is able to receive messages that control operation of the machine tool or processing station and is capable of transmitting messages indicating the condition of the machine tool or processing station. These messages are in the form of electrical signals usually carried on co-axial or twin-axial cable.

A personal computer or processor includes an interface circuit card electrically connected to the data, address and control leads of the personal computer. Usually this interface circuit card rests in an expansion slot of the personal computer. The interface card connects to the network of PLCs and includes addressable registers to which the PLCs can transmit messages. The interface card also includes command and reply registers that can respectively transmit and receive messages to and from the PLCs. The registers of the interface card are accessible by instructions executed in the personal computer.

The personal computer typically includes a visual display, a keyboard, instruction storage memory and a central processor. This central processor executes instructions, in the form of electrical signals, contained in the instruction storage memory in cooperation with characters provided to the displayed and readable by a user and in cooperation with characters received from the user through the keyboard.

This system also includes a general purpose spreadsheet program contained in the instruction storage memory for effecting a general purpose spreadsheet program in the personal computer. This spreadsheet program causes a spreadsheet to be displayed on the visual display. The displayed spreadsheet presents cells into which the user can insert information and @functions to execute desired arguments. The displayed spreadsheet also provides menu commands selectable by the user to effect desired actions in the displayed spreadsheet, but the spreadsheet program normally is only able to effect movement of information between defined files of data contained in the memory and the cells.

This system further includes add-in instructions for presenting add-in | functions and add-in menu commands operating through the spreadsheet program and displayed spreadsheet for cell contained functions and menu commands to move messages directly between the cells and the interface card with the lo interface card then moving the messages across the network of PLCs. This obtains a system in which the user can transmit messages controlling the operation of the machine tool or process station directly from the cells of the displayed spreadsheet to the addressed registers of a PLC and can request messages indicating the condition of the machine tool or processing station directly from the cells and receive the status information messages indicating the condition of the equipment directly in the cells.

In another aspect, this system includes add-in instruction means contained in the memory for presenting add-in menu commands and interrupt selected instructions. These add-in menu commands and interrupt selected instructions operate through the spreadsheet program for the interrupt instructions to move sequentially received messages initiated by the PLCs and received in the interface card to respective assigned address locations in memory upon occurrence of an interrupt signal generated by the interface card indicating receipt of such messages. User selection of the add-in menu commands move the message from the locations in memory to respective assigned ranges of cells in the displayed spreadsheet. Messages initiated from the PLC indicating the condition of the machine tools or process stations thus can be saved and moved directly to the cells of the displayed spreadsheet.

The general purpose spreadsheet program in the personal computer becomes initialized for operation with the message transfer from the cells of the displayed spreadsheet through a displayed initialization spreadsheet operating through the spreadsheet program. Add-in instructions contained in the memory provide this initialization spreadsheet and care for the loading of address assignments into certain memory locations accessible by the different parts of the spreadsheet program for effecting and achieving the desired result.

The invention also encompasses a substrate such as a floppy disk ordinarily used in personal computer, carrying the add-in instructions for effecting the transfer of message information to and from the cells of the displayed spreadsheet through the spreadsheet program.

With this invention, an operator can monitor and control the operation of many PLCs on a "real time" basis as conditions change in the manufacturing environment. The spreadsheet program provides many mathematical arguments that can be arranged to perform complex calculations rapidly in determining desired efficiencies and qualities of manufacturing. The ability to obtain "real time" data and give "real time" manufacturing commands in conjunction with these calculations for controlling large manufacturing plants achieves manufacturing control not previously available in an economical and easily understood system.

DESCRIPTION OF THE DRAWINGS

FIG. 1 is a schematic block diagram of a PLC system connected to a personal computer with an add-in program of the invention operating with a general purpose spreadsheet program to furnish real time message transfers between the network and the spreadsheet program;

FIG. 2 is a schematic block diagram of the system of the invention in more detail than depicted in FIG. 1;

FIG. 3 is a schematic block diagram of three aspects of the add-in program of the invention;

FIG. 4 is a diagram of the menu commands provided through the add-in program of the invention;

FIG. 5 is a schematic block diagram of the interaction between the hardware of a personal computer and the program instructions of a spreadsheet program including the invention to move received messages to assigned memory locations in a mailbox area and to dump messages stored in the mailbox memory locations into assigned ranges of cells in the spreadsheet program;

FIG. 12 is a schematic block diagram showing the interaction between hardware of a personal computer and program instructions of a spreadsheet program including the invention in initializing pointers to and the contents of memory locations for local variables;

FIG. 13 is a schematic block diagram depicting the organization for the add-in instructions of the invention for forming the add-in file SYL.ADN; and FIG. 14 is a schematic block diagram depicting the organization for the add-in instructions of the invention for forming the add-in file SYLAF.ADN.

DESCRIPTION OF THE PREFERRED EMBODIMENT

Figure 6:
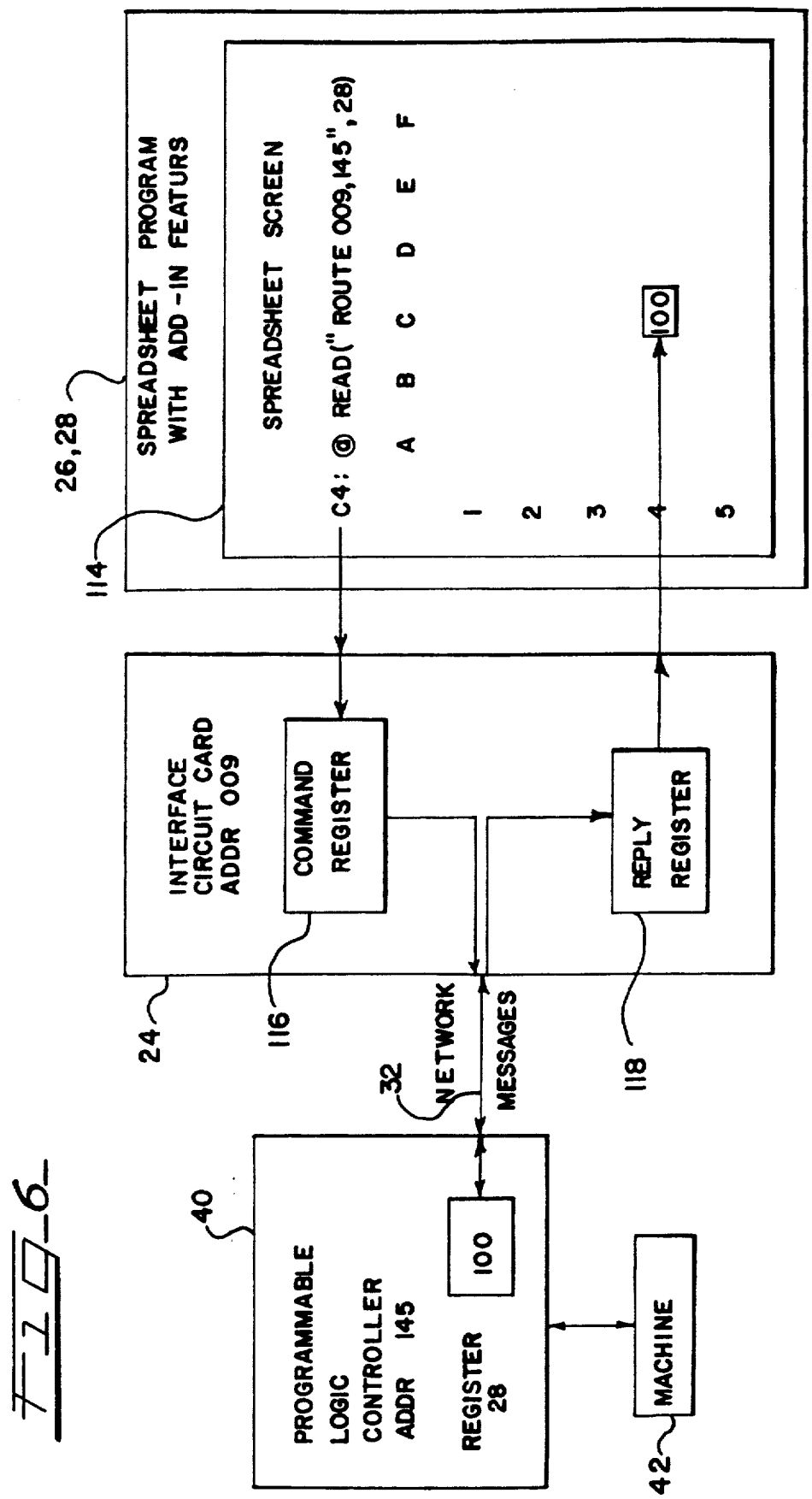
FIG. 6 is a schematic block diagram depicting the interaction between the hardware of a personal computer and a spreadsheet program including the invention executing an @READ function to read information from an addressable register in a PLC to a desired cell in the displayed spreadsheet.

In FIG. 1, a plant network 20 of programmable logic controllers (PLCs) to operate equipment stands connected to a personal computer 22 through a circuit card interface 24. The personal computer 22 operates a general purpose spreadsheet program 26 that has no ability to get or give real time messages over the plant network of PLCs. This spreadsheet program can be such as LOTUS 1-2-3 available from Lotus Development Corporation, Cambridge, Mass. The invention furnishes an add-in program 28 that operates through the general purpose spreadsheet program 26 to effect real time message transfers between the plant network of PLCs 20 and cells of the spreadsheet program 26. The transfer of messages through the spreadsheet program to the circuit card interface is depicted by double arrow-headed conductors 30 diagrammatically indicating the message transfer path, and the connection between the plant network 20 and the circuit card 24 is depicted by conductors 32.

In constructing this system 18, the user interconnects all of the PLCs with desired co-axial or twin-axial wires and constructs and arranges all the PLCs to effect positive message transfer between addressed registers of the PLCs. The user then obtains an interface circuit card 24, and installs it in an expansion slot of a personal computer 22. The interface card 24 then becomes connected to the network 20 and is assigned suitable network addresses. The user then loads the general purpose spreadsheet program into the personal computer using disk drives as desired and finally loads the add-in program 28 of the invention into the program files of the spreadsheet program.

The owner of the spreadsheet program known as LOTUS 1-2-3 has provided suitable instructions in the spreadsheet program for accepting the add-in program disclosed herein. The developer of the LOTUS 1-2-3 program also commercially sells program instructions under the trademark LOTUS Developer Tools used by the inventor of the present invention to effect the operation he desired. The LOTUS Developer Tools instruction program enables a programmer to develop instructions that extend or enhance the capability of the spreadsheet program and to create new § functions to be implemented in a LOTUS 1-2-3 spreadsheet. The program instructions of the LOTUS Developer Tools programs form no part of the invention herein but were used to develop the program instructions used in the invention. After all of this preliminary construction and arrangement of the hardware and program instructions, the user stands ready to program the PLCs and control the operation of the machine tools and process stations that they operate.

In FIG. 2, the plant network 20 interface assembly 34 connects to conductors 32 and is assigned address 45. PLC 36 connects to interface assembly 34 to operate machine 38 and is assigned address 045. PLC 40 also connects to interface assembly 34 to operate machine 42 and is assigned address 145. Interface assembly 44 likewise connects to conductors 32 and is assigned address 22. PLC 46 connects to interface assembly 44 to operate machine 48 and is assigned address 022. PLC 50 connects to interface assembly 44 to operate machine 52 and is assigned address 122. Interface assemblies 34 and 44 thus provide hardware connections to the co-axial or twin-axial conductors 32 and provide the two least significant numbers in the addresses for the PLCs 36, 40, 46 and 50. Conductors 32 connect to interface circuit card 24 at connector 54. In this system, interface card 24 has been assigned address 009 for purposes of explanation. Interface card 24 also can connect to an auxiliary or local PLC 56 through conductors 58 and connector 60. PLC 56 has been assigned 107 and is similar in construction and designed to PLCs 36, 40, 46 and 50. PLC 56 contains sensor and control registers 62 that connect to sensors 64, controls 66 and machine under control 68. The connections between PLCs 36, 40, 46 and 50 to their respective machines parallel the connection between PLC 56 and machine 58. PLC 56, its machine under control 68 and the connection to interface card 24 define what can be called a local system 70.

Interface card 24 includes command, reply and receiving registers 72 and can produce an interrupt signal on leads 74 under conditions to be described.

Personal computer 22 includes RAM memory 76 that contains the spreadsheet program 26, the add-in 28, mailbox memory locations 78 and pointer to local variables memory location 80.

Spreadsheet program 26 presents cells, menu driven commands and @ functions that can be inserted in the cells. Add-in program 28 present three features: menu commands to initialize the features for moving messages between the cells and the PLC registers, block moves of information between the cells and the PLC registers, fixed and floating point information formats and dumping the contents of the mailbox memory locations to assigned cells in the spreadsheet; @ functions to move messages between the spreadsheet cells and the PLC registers, and to perform logical operations; and interrupt driven information transfers from the interface card registers to corresponding memory locations in the mailbox area of the RAM memory 76. The add-in program 28 also includes memory locations 82 for local variables used in effecting the message transfers through the spreadsheet program 26.

Personal computer 22 also includes an operator usable keyboard 84, a visual display 86, a disk drive 88 that can receive a disk 90 carrying the spreadsheet program 26 or the add-in program 28. Disk 90 comprises a substrate capable of carrying program instructions in the form of such as magnetic bits but could be any other kind of substrate desired to carry the program instructions for loading into the memory of the personal computer.

It will be understood that software programs and instructions can constitute structure and materials in many different forms. For example, a program set of instructions can constitute magnetic signals or indicators on a magnetic substrate such as a floppy disk. Executing these instructions effects electrical signals across conductors in the processor to achieve desired results.

It will be understood that in the arrangement depicted in FIG. 2, the add-in program 28 operates through the spreadsheet program 26 to perform the indicated message transfers. After the add-in program becomes installed, the user operates only through spreadsheet § functions and men commands to effect the message transfers to the address registers of the PLCs. Alternatively, the plant network 20 of PLCs and the local systems 70 can be arranged as desired to operate desired machine tools and process stations.

Referring to FIG. 3, add-in program 28 provides menu commands 92 that the user enters through a keystroke of ALT-F7 on the keyboard of the personal computer. The interrupt instructions 94 perform a mailbox interrupt routine identified in the source code listing herein as MAIL_INT. The interrupt instructions 94 also perform a timer interrupt routine identified in the source code TIMER_INT. The user selectable @ functions insertable in the cells of the displayed spreadsheet include @READ, @WRITE, @BREAD, @BWRITE, @SYLERR, @MAIL, @FPREAD, @FPWRITE, @AND, @OR, @NOT and @TIMEOUT.

These @ functions operate with a particular format of information enclosed in parentheses following the @ function command. The format of information can include an address route specified to be a string of numbers separated by commas identifying first the address of the interface card in the personal computer and secondly the address of the PLC. Following the address can be a register addresses simply stated with a decimal number. Following the register number is a count number stated as a positive decimal number to indicate the number of registers in addition to the identified register from which information is to be read or written. Lastly, a bit number, ranging from 1 to 16 identifies the particular bit in a particular register in a particular PLC to be read to or from the cells.

With this format of message information, the @READ function requires the address and register information to read one register from the PLC device. The @WRITE function requires the address, register and value to be written to the identified register in the PLC. The values can range from −32768 to +32767. The @BREAD function requires an address, register and bit number format to read the register and return the contents of the identified bit position to the cell. The @BWRITE function requires the address, register, bit number and value to write a particular bit to an addressed register. A value of zero turns the bit off while a value not equal to zero turns the bit on. The @SYLERR function gives the last error message produce by the interface card.

The @MAIL function requires no following message information and obtains the address of the receiving register that received the last network message initiated by a PLC. This will be described presently.

The @FPREAD function requires an address and register identification to read one floating point register from a PLC. The register must be identified with an odd number. This returns a floating point number to a cell. The @FPWRITE function requires an address, register and value to write one floating point number to two registers starting at the identified register value. The register must be odd, and the value must be a floating point number in the range of −3.4E38 to 3.4E38.

The @TIMEOUT function specifies the maximum time to wait before a response is received from a PLC on the network and requires the specification of time in seconds. The logical functions occur in accordance with their names.

In FIG. 4, the menu 98 appearing upon the user entering the keystrokes ALT-F7 comprise five commands. Initializing the local interface card operates through the INIT routine in the source code. Reading a block of 128 registers from a PLC operate through the routine BLOCK_READ. Writing information to a block of 128 PLC registers operates under the routine BLOCK_WRITE. The floating point command operates through a sub-menu to read or write a block of 32 registers. Reading the block of 32 registers operates through the floating point numbers routine FP_READ. Writing to a block of 32 registers operates under the floating point numbers routine FP_WRITE.

The mailbox command under the ALT-F7 menu operates through two nested sub-menus. The first sub-menu 102 presents three commands. The SET command sets or assigns the mailbox memory locations 78 in the RAM memory 76 that receive information or data from a group of registers in the interface card 24. The SET command sets or assigns the cell locations in the displayed spreadsheet program that are to receive the mailbox data or messages. This command operates through the routine MAIL_SET.

The second command under the first sub-menu 102 is the DUMP command to execute the movement of the contents of the mailbox memory locations from the RAM memory to the assigned cells in the displayed spreadsheet program. The DUMP command operates under the routine MAIL_DUMP.

The third command under the first sub-menu 102 is reset and calls up a sub-sub-menu 104 with two commands in it. The first command of the sub-sub-menu 104 is OUTPUT and changes the displayed spreadsheet cell locations receiving data or information from the DUMP command. The OUTPUT command operates under the routine MBR_OUTPUT. The second command under the sub-sub-menu is a mailbox command. It operates to clear a specified or assigned mailbox from the memory locations in the RAM memory. It operates under the routine of MBR_MB.

The last command under the ALT-F7 menu is to quit the menu.

In FIG. 5, network messages addressed to particular receiving registers 106a through 106n in interface circuit card 24 pass over conductors 32. Substantively, the PLCs have been programmed to initiate message transfers to the interface circuit card at address 009 periodically or upon changes in the status of the controlled machine tool or process station. The initiation of sending the messages becomes programmed into the PLCs under operator control. Each PLC addresses a particular one of the receiving registers 106a through 106n for receiving the sent message Alternatively, the interface circuit card 24 can have one receiving register to receive all messages initiated by the PLCs upon suitable arrangement of the system to insure positive receipt and protection of the messages. In this system, interrupt-call program 94 moves the messages from the receiving registers to the respective assigned mailbox memory locations 78a through 78n while adding a time/date identifying information with each message. This later identifies to the spreadsheet program and the user the relative time of the status message from the PLCs. In moving the messages from the registers to the mailbox memory location, the interrupt-call program 94 will move the sequential messages received in receiving register 106a into sequential memory locations following memory locations 78a. The user assigned the mailbox memory locations 78a under control of the set mailbox location command in sub-menu 102 depicted in FIG. 4. Each mailbox can be as large as desired by the user to retain the sequential messages and time/date stamp of the messages until they are moved into the displayed spreadsheet.

Menu selected DUMP command 108 can be executed when desired by the user to move the contents of each mailbox in memory locations 78a through 78n to respective and assigned ranges of cells 110a through 110n in displayed spreadsheet 112. Thus the sequential messages and time/date stamps in memory locations 78a comprising one mailbox are moved by the DUMP command routine 108 moving them to sequential cells 110a in the displayed spreadsheet 112. In this manner, sequential message from the PLCs received in receiving register 106a are transferred to the mailbox memory locations 78a and then are dumped into the range of cells 110a. Likewise, PLC initiated messages to receiving register 106n are moved under interrupt program control to the mailbox at memory location 78n. The DUMP command routine moves the messages in mailbox memory location 78n into the range of cells 110n. This neatly provides organized and assigned transfer of PLC initiated messages to the displayed spreadsheet to insure positive message transfer to the cells and to insure against loss of PLC initiated messages.

In FIG. 6, spreadsheet program with add-in features 26, 28 identified in one block because they operate together as one unit and shall be identified with the double reference characters 26, 28. Spreadsheet program 26, 28 presents another spreadsheet screen 14 including an @READ function in cell C4. In cell C4, the @ function @READ ("route 009, 145", 28) indicates to the command registers 116 that a message is to be sent across the network conductors 32. The message commands PLC address 145 to send the contents of its register 28 back to the interface circuit card address 009, and thereafter the message received from the PLC address 145, register 28 is to be placed in cell C4 of the spreadsheet screen 114. Upon calculation of the spreadsheet screen 114, or the portion of the spreadsheet screen including cell C4, this @READ command becomes executed. The spreadsheet program 26, 28 operates to tell the interface circuit card 24 to send and receive the appropriate messages through respective command registers 116 and reply registers 118. Upon receipt of the message containing the contents of PLC address 145, register 28, the spreadsheet program 26, 28 obtains the contents of the reply register 118 and moves it into the cell C4 from which the user can observe the number 100.

Figure 7:
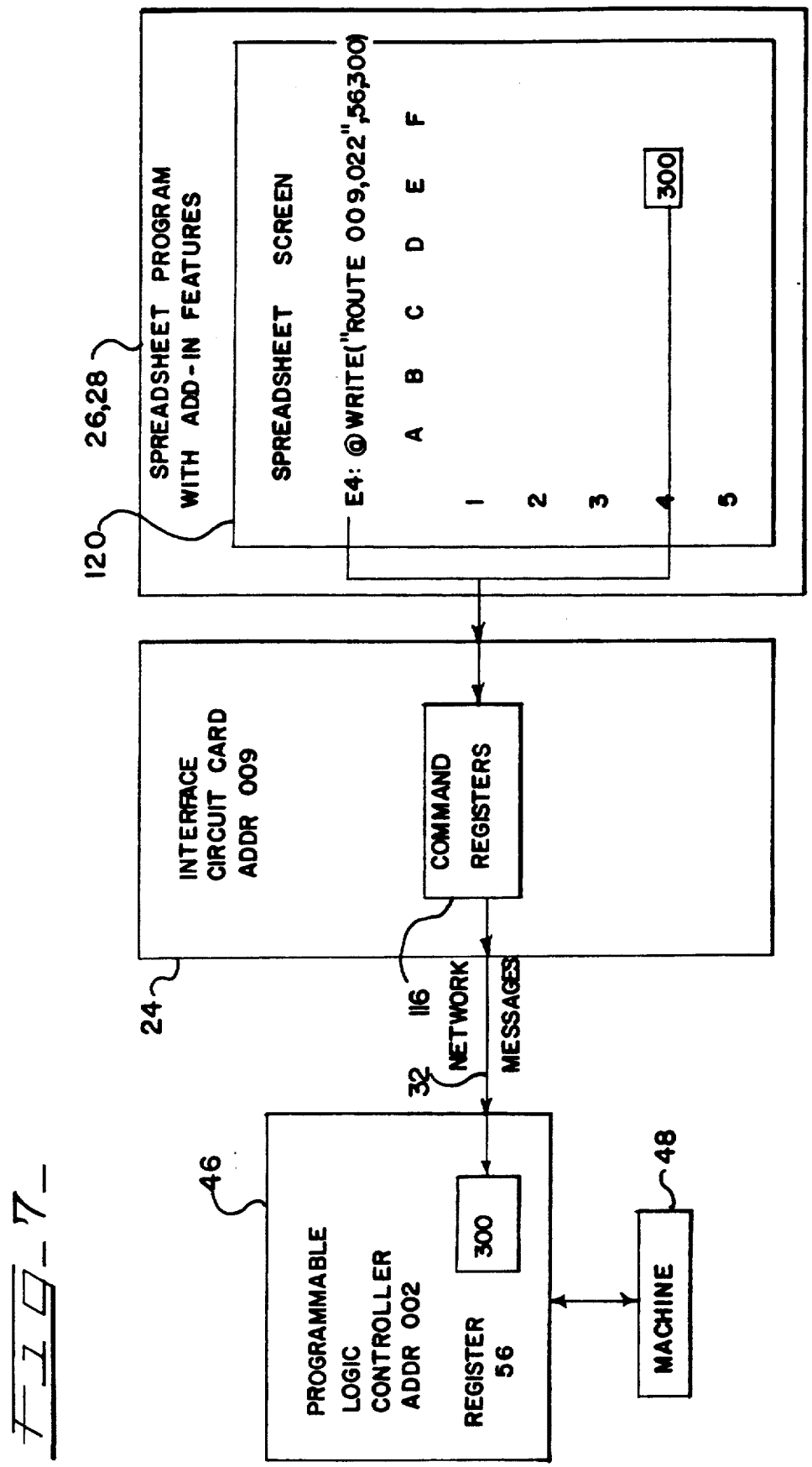
FIG. 7 is a schematic block diagram of the interaction between the hardware of a personal computer and a spreadsheet program including the invention executing an @WRITE function to write information from a cell in the displayed spreadsheet to an addressed register in a PLC.

In FIG. 7, spreadsheet program 26, 28 presents another spreadsheet screen 120 having a cell E4 containing an @WRITE function. That function is @WRITE ("route 009, 022", 56, 300). It indicates that interface circuit card 24, address 009 is to write a message to PLC address 022, register 56 with the message containing the contents of cell E4 which is 300. Upon executing the spreadsheet screen 120 or that portion containing cell E4, spreadsheet program 26, 28 conveys the necessary information to command register 116 and interface circuit card 24 to effect the desired message. That message then travels across the conductors 32 to PLC 46 having address 022 and register 56 to insert the number 300 therein.

The @ functions depicted in FIGS. 6 and 7 thus can be used upon normal recalculation of the spreadsheet screens 114 and 120 to transfer information between the cells of the spreadsheet screen and registers of desired PLCs. The user does not have to prompt individual message transfers and the user can write the mathematical and logical @ functions available in the general purpose spreadsheet program 26 to establish procedures for automatically controlling operations of such as machines 42 and 48. Specifically, the @READ function depicted in FIG. 6 can indicate the number of screws manufactured on an automatic screw machine 42. When that number equals 100, the mathematical and logical @ functions inserted into such as spreadsheet screen 120 by the user can write the value 300 into PLC address 022, register 56 to advance a conveyor machine 48 to the next work station.

Figure 8:
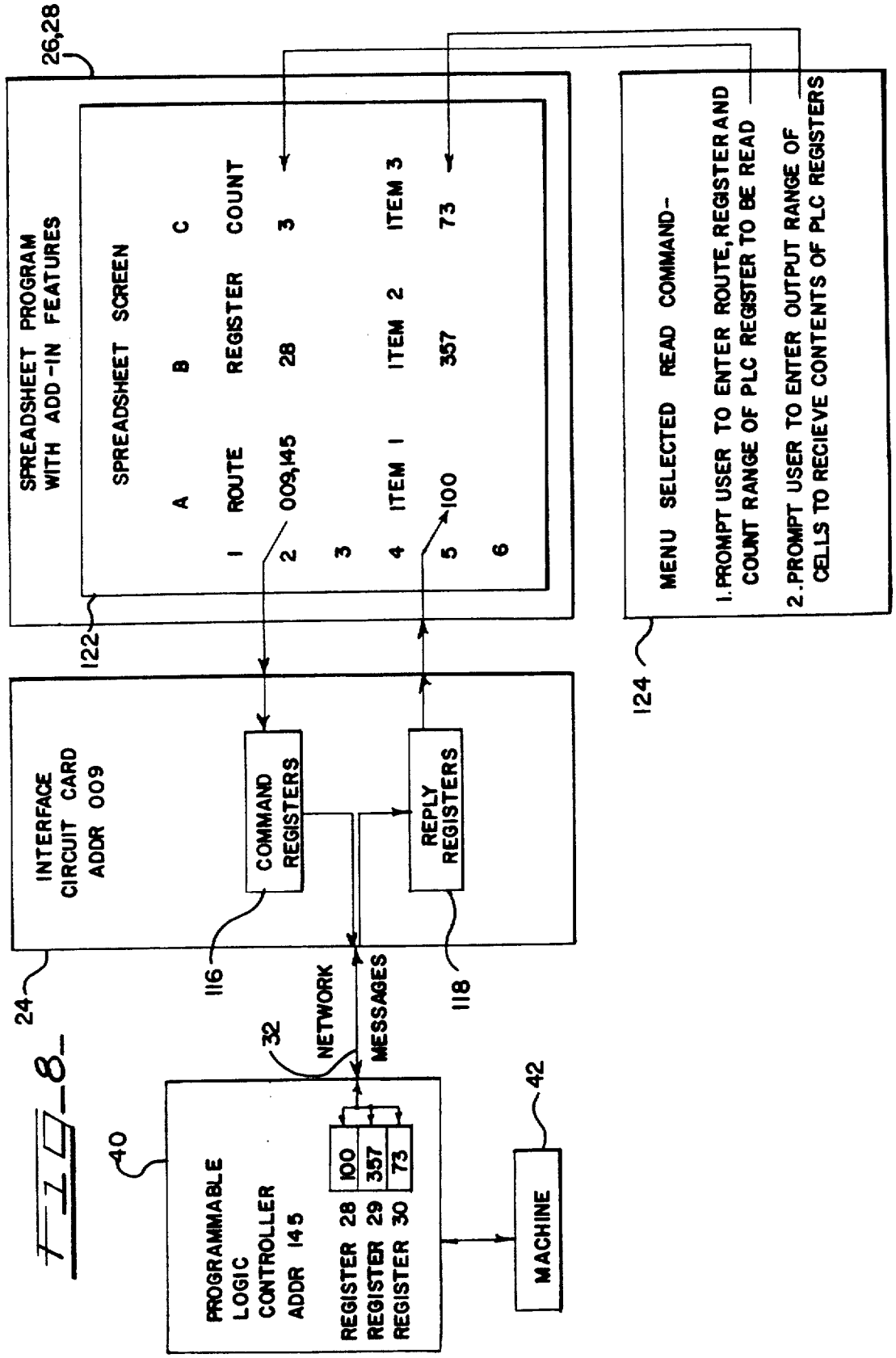
FIG. 8 is a schematic block diagram depicting the interaction between the hardware of a programmable computer and the menu commands of a spreadsheet program including the invention to perform a menu selected READ command of reading blocks of information from addressed registers in a PLC to assigned cells in the displayed spreadsheet.

In FIG. 8, spreadsheet program 26, 28 presents another spreadsheet screen 122 used in conjunction with the menu selected READ command 124 to read a block of PLC registers into a range of cells in spreadsheet 122. The READ command 124 first prompts the user to enter the route, register and count range of PLC registers to be read, respectively in cells A2, B2 and C2. Thus the message route is 009, 145. The register to read starts at register 28, and the range of PLC registers thereafter is three. The READ command 124 also prompts the user to enter the output range of cells to receive the contents of the PLC registers. In spreadsheet screen 122, the user has entered the cells to be A5, B5 and C5. Upon executing the menu READ command 124, spreadsheet program 26, 28 moves appropriate message information to command registers 116 which sends appropriate messages over conductors 32. PLC 40 having address 145 receives the READ command and transmits messages containing the contents of registers 28, 29 and 30 back to the interface circuit card 24 having address 009. Substantively, registers 28, 29 and 30 in PLC 40 can represent the status of screw machine 42. When reply registers 118 receive the messages containing the contents of registers 28, 29 and 30, spreadsheet program 26, 28 moves the information content thereof respectively into cells A5, B5 and C5.

Figure 9:
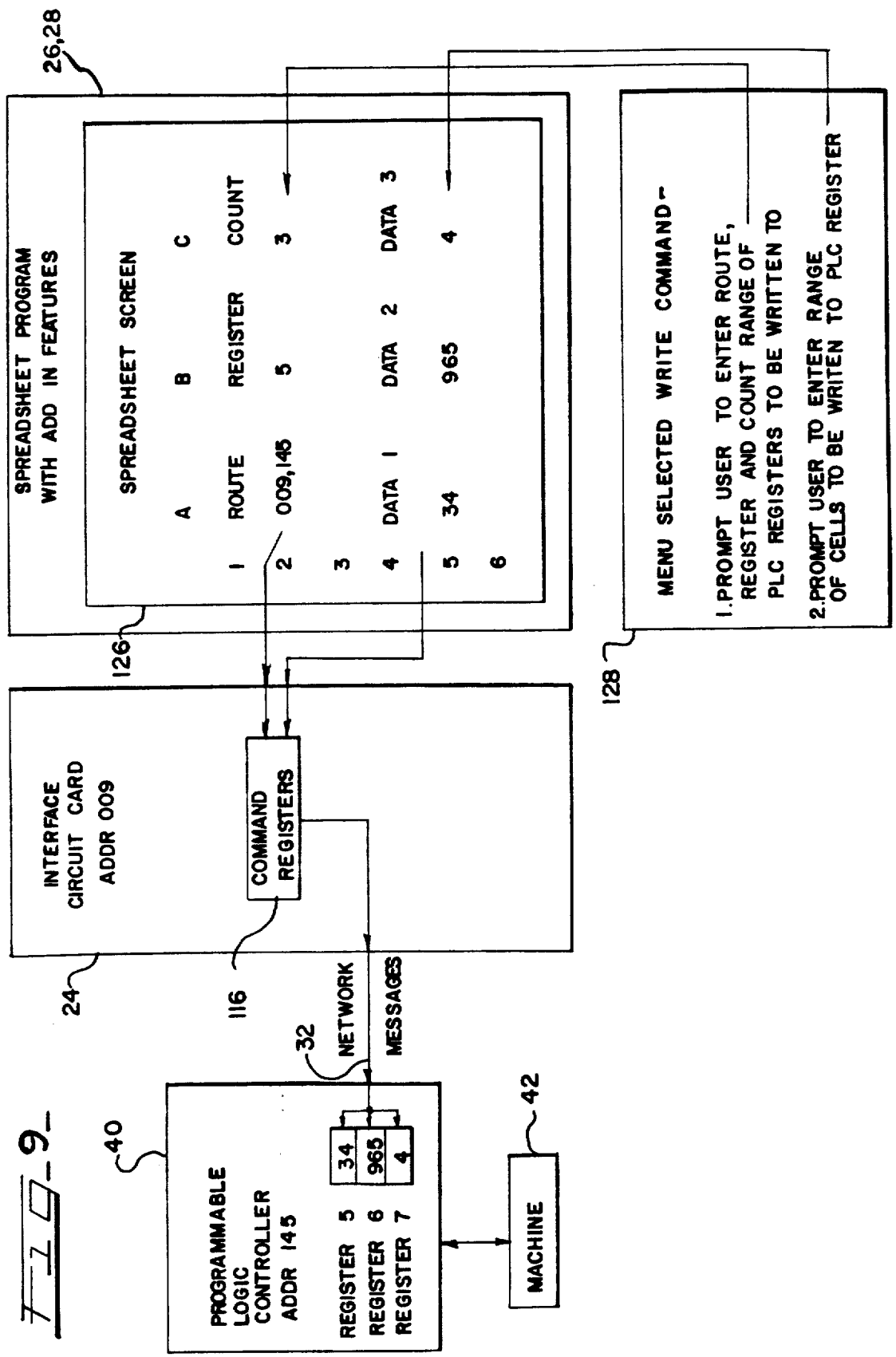
FIG. 9 is a schematic block diagram of the interaction between the hardware of a personal computer and a spreadsheet program including the invention to perform a menu selected WRITE command of writing information from assigned cells in a displayed spreadsheet to addressed registers in a PLC.

In FIG. 9, spreadsheet program 26, 28 presents a new spreadsheet screen 126 used to write a block of data to the registers of a PLC. The menu selected write command 128 first prompts the user to enter the route, register and count range of the PLC registers to be written to. This information contained in spreadsheet screen 126, cells A2, B2 and C2 respectively. The WRITE command 128 also prompts the user to enter the range of cells, the contents of which are to be written to the PLC registers. This information is contained respectively in cells A5, B5 and C5. Upon executing the WRITE command 128, spreadsheet program 26, 28 moves the appropriate information to command registers 116 of interface circuit card 24. Interface card 24 then sends the appropriate messages across the conductors 32 to PLC 40, having address 145, and particularly to registers 5, 6 and 7. This information can be such as control information to control the operation of such as automatic screw machine 42.

In this manner, the menu selected READ and WRITE commands can monitor the status of a machine and control its operation through menu selected commands and spreadsheet screen contained messages address and content information.

Figure 10:
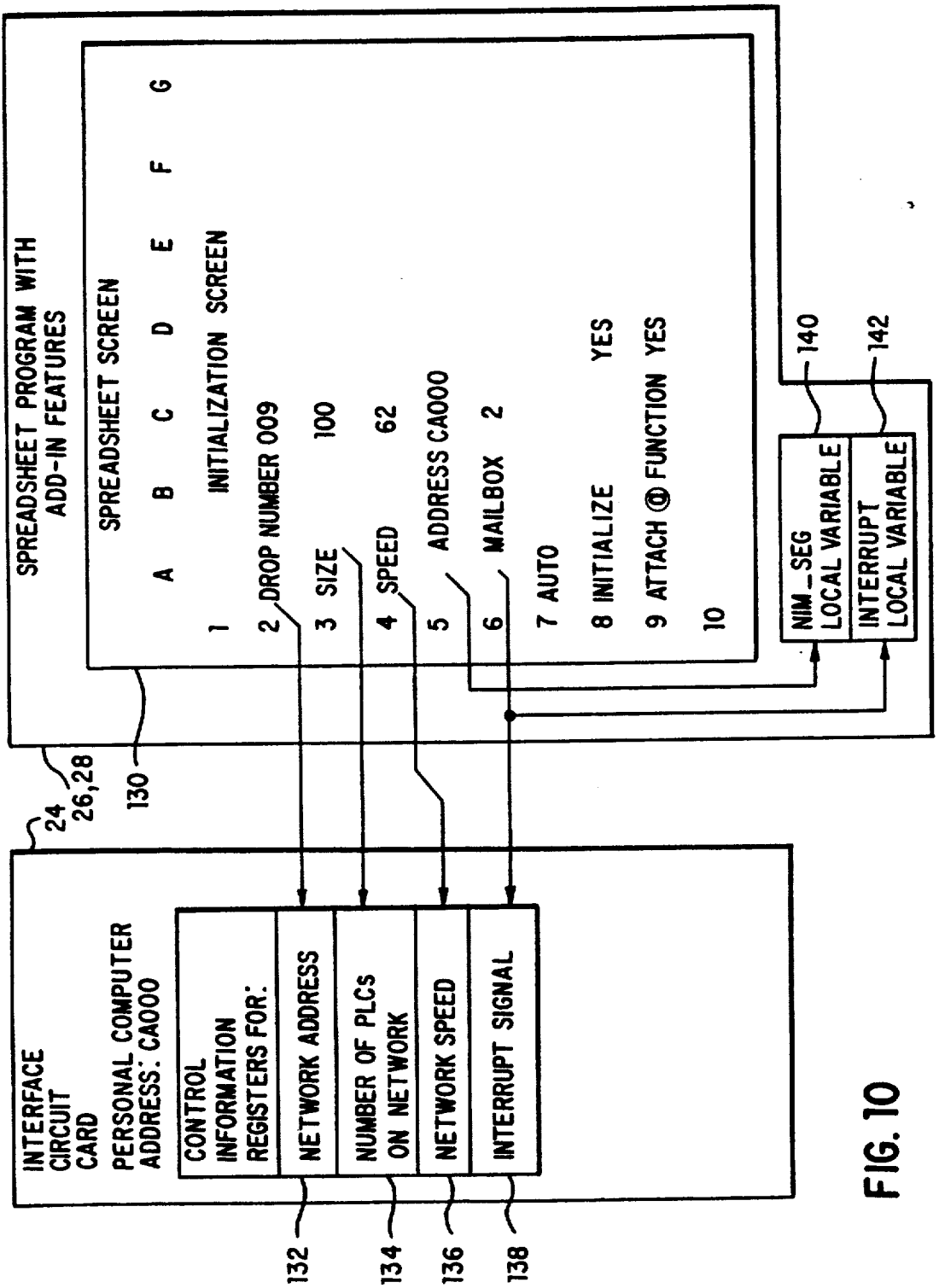
FIG. 10 is a schematic block diagram depicting the interaction between the hardware of a personal computer and a spreadsheet program including the invention to initialize the operation of the spreadsheet program in the personal computer through a displayed spreadsheet.

In FIG. 10, spreadsheet program 26, 28 presents an initialization spreadsheet screen 130 used to initialize local variables and information in the interface circuit card 24 before message transfers can occur. Interface circuit card 24 contains dip switches that are user setable to assign an address of the personal computer to the registers of the interface circuit card 24. In the example depicted in FIG. 10, this address is selected to be CA000 expressed in hexadecimal. Circuit card 24 also contains control information registers for receiving and containing a network address 132, the number of PLCs on the network 134, the speed at which the network operates 136 and the interrupt signal 138 produced by the circuit card 24 on lead 74, previously explained. Spreadsheet screen 130 contains respectively in cells C2 through C6 the information inserted by the user to initialize the spreadsheet program 26, 28 and the circuit card 24. Upon execution of a menu command, spreadsheet program 26, 28 moves this information of spreadsheet screen 130 to the circuit 24 and to two local variables memory locations 140 and 142. As depicted in FIG. 10, the memory locations for the two indicated local variable occur within the spreadsheet program 26, 28 for easy access thereto. In particular, cell C2 indicates that the network address for card 24 shall be 009. Cell C3 indicates that the number of PLCs in the network is 100. Cell C4 indicates that the speed of the messages on the network is indicated by the code 62. Cell C6 indicates that the mailbox interrupt signal shall be number 2. These four pieces of information respectively are moved to registers 132 through 138 and circuit card 24 upon execution of a menu selected command, such as INITIALIZE invoked by ALT-F7. Additionally, cell C5 indicates that the address of the circuit card 24 in the expansion slot of the personal computer has been set to be CA000 and hexadecimal, and this information is moved by the spreadsheet program 26, 28 to the NIM_SEG local variable memory location 140. The mailbox interrupt number 2 also is moved by the spreadsheet program 26, 28 to the interrupt local variable memory location 142. The contents of cells D8 and D9 indicate to the spreadsheet program 26, 28 that subsequent selections of the spreadsheet program in the personal computer automatically can initialize the spreadsheet program 26, 28 to the values indicated in cells C2 through C6 and that it can automatically attach the @ functions into the spreadsheet program 26, 28.

Figure 11:
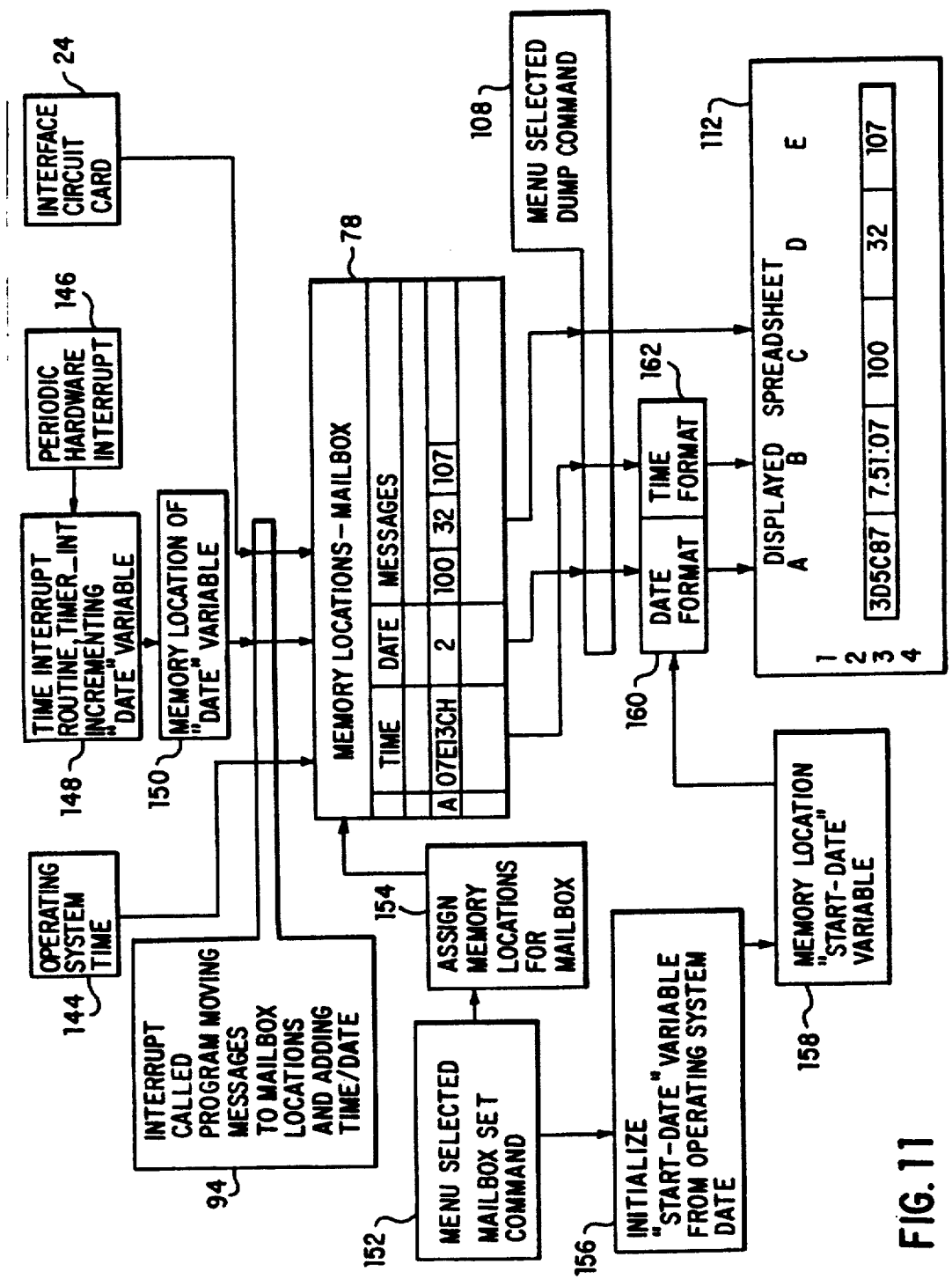
FIG. 11 is a schematic block diagram of the interaction between the hardware of a personal computer and the program instructions of the invention similar to that shown in FIG. 5 and further emphasizing the date and time stamping of received messages initiated from the PLCs.

In FIG. 11, the interrupt call program 94 operates to move messages from the interface circuit card 24 into the assigned mailbox memory locations in mailbox memory locations 78 together with the time and date information. Interrupt call 94 directly operates to move the operating system time 144 into memory location A, expressed in hexadecimal. A periodic hardware interrupt 146 occurs in the personal computer regular intervals. The timer interrupt routine, TIMER_INT 148 increments a date variable and places same in a memory location 150 of a "date" variable among the local variables of the spreadsheet program 26, 28.

Previously, a menu selected mailbox SET command 152 is used to effect a routine 154 that assigns memory locations for the mailbox and that effects a routine 156 to initialize a start-date variable from the operating system date. Routine 156 places the "start-date" variable in memory location 158 of the local variables.

The operating system displays the date by using an offset from a fixed date such as January 1, 1900. During the initialization of the spreadsheet program 26, 28, through the menu selected mailbox command 152, the add-in commands 28 ascertain the offset from that initial date to the present date and insert an indication of same in the "start-date" variable memory location 158. The operating system normally does not provide the date or date offset in a manner accessible from the spreadsheet program with add-in features 26, 28 so instead, the invention provides the timer interrupt routine 148. This counts the periodic hardware interrupts occurring in the personal computer at 18 times a second to increment a "date" variable and place it in the memory location of 150. Thus the date column of the memory location of the mailbox carries an offset from the initial date of the operating system to the present date. Later, the menu selected dump command 108 can use the offset with the start-date variable properly to format the date in such as cell A3 of the displayed spreadsheet 112. The operating system time, which is available directly from the operating system time to the spreadsheet program with add-in features 26, 28 rests in the time column of the memory location of the mailbox and can be transformed upon the effecting the menu selected DUMP command 108 to present the proper time at such as cell B3 in the displayed spreadsheet 112. The date format and time format functions become effected through blocks 160 and 162 respectively.

As previously explained, the menu selected DUMP command 108 moves the messages from the respective mailboxes in the memory location 78 into the assigned output cells of the displayed spreadsheet 112. In the depicted example of FIG. 11, the output ranges of cells are A3 through E3.

In FIG. 12, the add-in program 12 has been assigned to memory locations 164 and 166. These can be sequential or non-sequential as desired by the add-in features of the spreadsheet program 26. In any event, memory locations 164 contain the program named SYLAF.ADN for the @ functions while memory locations 166 contain the program called SYL.ADN for the menu and interrupt commands. Memory locations 166 also include the memory locations 82 of the local variables such as IPC.NIM_SEG, IPC.ACTIVE and IPC.TIMEOUT_SECS.

When the spreadsheet program 26 loads the add-in files into the memory locations, it first loads the SYL.ADN file into memory location 168. After loading, the spreadsheet program 26 executes the start-up init routine 168. That routine 168 executes block 170 to clear the pointers to the locations of the local variables contained in memory locations 80. Memory locations 80 comprises an inter-program communications areas containing pointers to the memory locations of local variables. The memory location of the pointer is defined to be addresses 04F8 hexadecimal and 04FA hexadecimal. The first address carries the offset of the pointer while the second address carries segment of the pointer.

When the spreadsheet program 26 next loads the memory locations 164 with the program SYLAF.ADN, the start-up routine 172 contained therein sets an error if the pointers are not cleared. That occurs at block 174.

The next thing that occurs is for menu selected initialized routine 176 under memory locations 166 to set the pointers to the locations of the local variables at block 178. The menu selected initialized routine 176 also sets the contents of the local variables in block 180 as has been described.

Thereafter, menu selected function routines 182 get and use the contents of local variables through block 184 with the variables being contained within the file or program of SYL.ADN which also contains the menu selected function routine. Thus the menu selected function routines do not need the offset pointer to the local variables but can access them directly.

The @ function routines, however, can be located other than sequentially with the local variables and get the pointer to the local variables through block 186. Once the @ function routines 188 have the pointers to the local variables, they can obtain the information contained therein to execute the desired message transfers previously described.

In FIG. 13, master file 190 for the menu functions SYL.ASM includes files SYLI.ASM, SYLHELP.ASM, SYLINT.ASM, SYLMB.ASM, SYLMDATE.ASM, SYLERR.ASM, SYLADDR.ASM, and SYLFP.ASM. These include files perform functions identified in block 190. These menu function files of master file 190 become assembled in block 192 to obtain the add-in file SYL.ADN in block 194.

In FIG. 14, master file 196 for the @ functions includes the SYLAF.ASM file and include files SYLFPAT.ASM and SYLNORM.ASM. The include files in master file 196 perform the identified functions. These files are assembled in block 198 to obtain the add-in file SYLAF.ADN in block 200.

The source code listing for the add-in program 28 of the invention comprises program pages 1-118 and is set forth herein The invention thus achieves a user friendly procedure for moving information messages to and from cells in a spreadsheet program and addressed registers in PLCs. This provides a user with easy access to the real-time information needed to perform real-time control of machinery and processing stations In the preferred embodiment, the PLC network 20 is that made and sold by the Square D Company of Palatine, Ill., under the SY/NET trademark of programmable logic controllers, network interface modules and SY/LINK interface cards for personal computers. The PLCs in this network are identified with the mark SY/MAX. Network specifications for all of this hardware and relay ladder programming instructions are commercially available.

Modifications and variations of the present inventions are possible in light of the above teachings. It will be understood that different commercial versions of spreadsheet programs may use variations of the names used herein for functions used or inserted in the cells. For example, the @functions can also be called functions without the @ prefix. It is therefore to be understood that within the scope of the appended claims, the invention may be practiced otherwise than as specifically described.

I claim:

1. A system for providing real time control of operating equipment with a programmable logic controller, said programmable logic controller being capable of receiving control messages to control operation of said equipment and being capable of transmitting status messages indicating a condition of said equipment, said system comprising:
   A. a computer having an operably interconnected visual display, keyboard, memory and central processor, said computer for sequentially executing instructions contained in said memory in cooperation with characters received from said keyboard;
   B. an interface electrically connected between said computer and said programmable logic controller for transmitting messages between said programmable logic controller and said computer;
   C. spreadsheet instructions means contained in said memory for effecting a general purpose spreadsheet program in said computer, said spreadsheet instruction means providing cells displayable by said visual display, into which said user can insert information, @ functions that can be inserted into said cells via said keyboard and selectable menu commands to effect actions in said spreadsheet instruction means, said spreadsheet information means normally only being able to effect movement of information between files of data contained in said memory and said cells; and
   D. add-in instruction means contained in said memory for presenting add-in @ functions and add-in menu commands operating through said spreadsheet instruction means, said add-in instruction means for moving messages directly between said cells and said programmable logic controller via said interface means, said messages moving from said cells to said programmable logic controller comprising said control messages for controlling the operation of said equipment and said messages moving from said programmable logic controller to said cells comprising said status messages indicating the condition of said equipment.

2. The system of claim 1 in which said add-in instruction means includes @read means for causing said programmable logic controller to transmit a status message to said spreadsheet instruction means.

3. The system of claim 2 in which said @read means includes characters indicating an @read function and route addresses of said interface means and said programmable logic controller.

4. The system of claim 3 in which said @read means includes characters indicating a certain register in said programmable logic controller, the contents of which are to be sent in said status message.

5. The system of claim 2 in which said cells of said spreadsheet instruction means are addressable by characters from said keyboard and said @read means are addressed into a certain cell by characters from said keyboard.

6. The system of claim 1 in which said add-in instruction means includes @write means for transmitting a control message to said programmable logic controller.

7. The system of claim 6 in which said @write means includes characters indicating an @write function and route addresses of said interface means and said programmable logic controller.

8. The system of claim 7 in which said @write means includes characters indicating a certain register in said programmable logic controller that is to receive said control message.

9. The system of claim 1 in which said add-in instruction means includes menu initialize means for moving initial system information to said interface means.

10. The system of claim 1 in which said add-in instruction means includes first file means for containing local variables used to move messages directly between said cells and said interface means and for containing said menu commands, said add-in instruction means also including second file means for containing said add-in @functions, and said spreadsheet instruction means including assignment means for assigning said first and second file means to specific memory locations.

11. A system for operating equipment by an operator, the system comprising:
   A. a plurality of programmable logic controllers coupled to the equipment, said programmable logic controllers each transmitting messages on a network indicating the condition of said equipment;
   B. a computer having operably interconnected visual display, keyboard, memory, and central processor, said computer for sequentially executing instructions contained in said memory;
   C. interface means electrically connected between said computer and said network for receiving messages from each of said programmable logic controllers, said interface means including a plurality of message registers, of which at least one of said message registers is associated with each of said programmable logic controllers, the messages from each of said programmable logic controllers being overwritten on a preceding message in said registers, said interface means including interrupt means for interrupting operation of said computer in response to receiving a message in any one of said message registers;
   D. spreadsheet instruction means contained in said memory for effecting a general purpose spreadsheet program in said computer, said spreadsheet instruction means providing cells into which said operator can insert information and menu commands selectable by said operator, said spreadsheet means normally only being able to effect movement of information between files of data contained in said memory and said cells; and E. add-in instruction means contained in said memory for presenting add-in menu commands and interrupt selected instructions operating through said spreadsheet instruction means for said interrupt selected instructions to move sequentially received messages from said message registers to respective assigned address locations in said memory upon occurrence of each interrupt signal, and for said add-in menu commands to move said messages form said assigned address locations in said memory to respective assigned cells in said spreadsheet instruction means so that messages from said programmable logic controllers indicating the condition of said equipment can be saved and moved directly to said cells.

12. A device for transmitting and receiving electrical signals forming messages to and from respective addressable registers located in respective addressable programmable logic controllers that are connected together over a communications network, said device comprising:

A. process means connected to said communications network for moving said electrical signals forming messages to and from respective registers located in said processor means, said respective registers for each of said respective addressable programmable logic controllers being addressable form said communications network and accessible from said processor means;

B. spreadsheet means contained in said processor means, said spreadsheet means presenting a spreadsheet of cells into which information can be inserted to facilitate executing actions through said spreadsheet means, said spreadsheet means being capable of accessing said registers in said processor means through said actions;

C. add-in program means contained in said processor means for inserting in at least one cell information including the address of a particular register in a particular programmable logic controller to which a message is to be sent and indicating the content of said message; and d. add-in program means contained in said processor means for executing an action in said spreadsheet means to cause said spreadsheet means to transmit said message from said cell through said registers in said process means to the said addressed particular register in said particular programmable logic controller.

13. The device of claim 12 in which said means for executing executes an @WRITE function.

14. A system for permitting real-time operation by a user of operating equipment with at least one programmable logic controller, said programmable logic controller including addressable registers, said programmable logic controller being capable of receiving messages addressed to said addressable registers to control operation of said equipment, and for transmitting messages from said addressable registers indicating the condition of said equipment, said messages being in the form of electrical signals, said system comprising:

A. process means having an operably interconnected visual display, keyboard, instruction storage memory and central processor for sequentially executing instructions contained in said instruction storage memory;

B. interface means coupled between said processor means and said programmable logic controller, said interface means including message registers capable of transmitting and receiving addressed messages to and from said addressable registers in said programmable logic controller and being accessible by said processor means, said interface means for transmitting addressed messages to said addressable registers in said programmable logic controller, and for presenting to said processor means information contained in received addressed messages form said addressable registers in said programmable logic controller, said interface means including interrupt means for interrupting the operation of said processor means in response to receiving an addressed message in any one of said message registers;

C. spreadsheet instruction means contained in said instruction storage memory for effecting a general purpose spreadsheet program in said processor means, said spreadsheet instruction means providing a spreadsheet having cells displayed by said visual display into which said user can insert information, @ functions that can be inserted into said cells by said user to effect actions in said spreadsheet program, and menu commands selectable by said user to effect actions in said spreadsheet program, said spreadsheet instruction means normally only being able to effect movement of information between files of data contained in said instruction storage memory and said cells; and D. supplemental instruction means contained in said memory for operating through said spreadsheet instruction means to move messages directly between said cells and said addressable registers in said programmable logic controller through said interface means, so that said user can transmit addressed messages controlling the operation of said equipment directly from said cells to said addressable registers in said programmable logic controller, can request messages from said cells indicating the condition of said equipment, and can receive in said cells said messages initiated by said programmable logic controller indicating the condition of said equipment.

* * * * *